(12) United States Patent  
Zhou

(10) Patent No.: US 7,079,697 B2  
(45) Date of Patent: Jul. 18, 2006

(54) IMAGE COMPRESSION WITH TRANSFORM COEFFICIENT ANALYSIS

(75) Inventor: Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 618 days.

(21) Appl. No.: 10/102,323

(22) Filed: Mar. 19, 2002

(65) Prior Publication Data

US 2002/0164081 A1   Nov. 7, 2002

Related U.S. Application Data

(60) Provisional application No. 60/343,740, filed on Dec. 28, 2001, provisional application No. 60/277,156, filed on Mar. 19, 2001.

(51) Int. Cl.
*G06K 9/46* (2006.01)
*G06K 9/36* (2006.01)

(52) U.S. Cl. .................................... 382/250; 382/232

(58) Field of Classification Search ................ 382/172, 382/218, 232, 233, 250; 375/240.03, 240.18, 375/240.2; 348/395.1, 400.1, 414.1
See application file for complete search history.

(56) References Cited

U.S. PATENT DOCUMENTS

| | | | | |
|---|---|---|---|---|
| 4,541,012 A | * | 9/1985 | Tescher | 348/400.1 |
| 5,412,425 A | * | 5/1995 | Nagano | 348/372 |
| 5,461,422 A | * | 10/1995 | Hsieh | 375/240.03 |
| 5,528,293 A | * | 6/1996 | Watanabe | 348/231.2 |
| 5,630,033 A | * | 5/1997 | Purcell et al. | 345/418 |
| 5,809,173 A | * | 9/1998 | Liu et al. | 382/233 |
| 5,886,741 A | * | 3/1999 | Srivastava | 348/395.1 |
| 5,986,710 A | * | 11/1999 | Kim et al. | 375/240.2 |
| 6,348,945 B1 | * | 2/2002 | Hayakawa | 375/240.18 |

* cited by examiner

*Primary Examiner*—Amir Alavi
(74) *Attorney, Agent, or Firm*—Carlton H. Hoel; W. James Brady; Frederick J. Telecky, Jr.

(57) ABSTRACT

A method of image/video compression with intra-coding blocks analyzed for sum of absolute magnitudes of AC coefficients of DCT of block to determine whether to approximate the block with 0 AC coefficients, and with inter-coding blocks analyzed for sum of absolute differences of block and predicted block to determine whether to approximate the block with a 0 block.

3 Claims, 3 Drawing Sheets

IMAGE COMPRESSION WITH TRANSFORM COEFFICIENT ANALYSIS

CROSS REFERENCE TO RELATED APPLICATIONS

This application claims priority from provisional applications Ser. Nos. 60/277,156, filed Mar. 19, 2001, and 60/343,740, filed Dec. 28, 2001, The following pending U.S. patent applications disclose related subject matter and have a common assignee with the present application: Ser. No. 10/025,531, filed Dec. 19, 2001.

BACKGROUND OF THE INVENTION

This invention relates to image and video compression methods and implementations and inclusive systems.

Recently, Digital Still Cameras (DSC's) have become a very popular consumer appliance appealing to a wide variety of users ranging from photo hobbyists, web developers, real estate agents, insurance adjusters, photo-journalists to everyday photography enthusiasts. Recent advances in large resolution CCD arrays coupled with the availability of low-power digital signal processors (DSP's) has led to the development of DSC's that come quite close to the resolution and quality offered by traditional film cameras. These DSC's offer several additional advantages compared to traditional film cameras in terms of data storage, manipulation, and transmission. The digital representation of captured images enables the user to easily incorporate the images into any type of electronic media and transmit them over any type of network. FIG. 5 illustrates functional components of a typical DSC. The ability to instantly view and selectively store captured images provides the flexibility to minimize film waste and instantly determine if the image needs to be captured again. With its digital representation the image can be corrected, altered, or modified after its capture. See for example, Venkataraman et al, "Next Generation Digital Camera Integration and Software Development Issues" in Digital Solid State Cameras: Design and Applications, 3302 Proc. SPIE (1998). Similarly, U.S. Pat. Nos. 5,528,293 and 5,412,425 disclose aspects of digital still camera systems including storage of images on memory cards and power conservation for battery-powered cameras.

Further, DSC's can be extended to capture video clips (short video sequences) and to compress images/video with methods such as JPEG for still images and MPEG for video sequences. In DCT-based video compression such as H.261, H.263, MPEG1, MPEG2, and MPEG4, or image compression such as JPEG, a picture is decomposed into macroblocks. Each macroblock contains a certain number of 8×8 blocks, depending upon the chroma-format used. For example, in the case of 4:2:0 chroma-format a macroblock is made up of four 8×8 luminance blocks (i.e., 16×16 pixels) and two 8×8 chrominance blocks (each located as a sub-sampling of the 16×16). FIG. 3 depicts the block diagram of DCT-based video encoding. In order to reduce the bit-rate, 8×8 DCT (discrete cosine transform) is used to convert the blocks into the frequency domain for quantization. The first coefficient (0 frequency) in an 8×8 DCT block is called the DC coefficient; the remaining 63 DCT-coefficients in the block are called AC coefficients. The DCT-coefficients blocks are quantized, scanned into a 1-D sequence, and coded by using variable length coding (VLC). For predictive coding in which motion compensation (MC) is involved, inverse-quantization and IDCT are needed for the feedback loop. Except for MC, all the function blocks in FIG. 3 operate on 8×8 block basis.

U.S. Pat. No. 5,886,741 discloses a video compression using a zero block predictor to reduce encoding complexity.

In some cases, however, processors may have limited processing power, which could make real-time video encoding impossible. Similarly, other digital cameras, such as cameras in a network, may have limited processing power which impairs video encoding.

SUMMARY OF THE INVENTION

The invention provides a video and image compression based on macroblocks and has a block analysis in order to decide among alternative modes of compression where the block analysis uses AC DCT coefficients.

This has advantages including significant reduction in the encoding complexity without significantly harming image or video coding quality.

BRIEF DESCRIPTION OF THE DRAWINGS

The drawings are heuristic for clarity.

DESCRIPTION OF THE PREFERRED EMBODIMENTS

1. Overview

The preferred embodiment video compression/decompression methods use DCT on blocks and take advantage of the fact that after the quantization of AC DCT-coefficients a significant number of blocks are all zeros except for the (quantized) DC coefficient and thus may be encoded simply. The preferred embodiments predict all zero quantized AC coefficients for a block with a statistic such as average, and then so encode. The preferred embodiment zero-AC-block prediction methods apply to both macroblocks of Intra-coded frames (i.e. I frames and still images) and of non-Intra frames (Predictive or Bidirectional frames, i.e. P or B frames, respectively).

Figure 3:
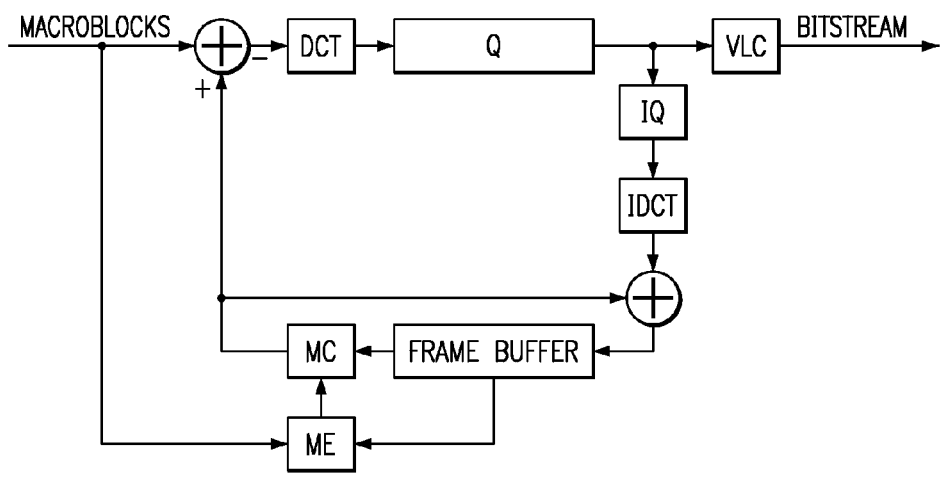
FIG. 3 illustrates motion compensated video compression.

Indeed, for the typical MPEG-4 test sequence Coastguard (352×288, 30 frame/s, 1.5 Mbit/s, IPPP . . . IPPP mode, every 15 frames one I-frame), for example, it was found that about 20% of the luminance blocks and 95% of the chrominance blocks have AC components which are all zeros after Quantization. Considering that Coastguard has fairly complex motion and content, the zero AC block percentage should be much higher for simpler sequences. Therefore, the preferred embodiments predict the quantization results in advance, so DCT, Quantization, VLC and IDCT need to be performed on only about the half of the blocks, which significantly increases the coding speed without significantly decreasing the coding quality. FIG. 3 illustrates the computations which the encoding entails and shows that for a block with zero AC DCT coefficients, the Quantization and Variable Length Coding need only be applied to the DC coefficient and the motion compensation loop Inverse Quantization and Inverse DCT are trivialized.

Figure 5:
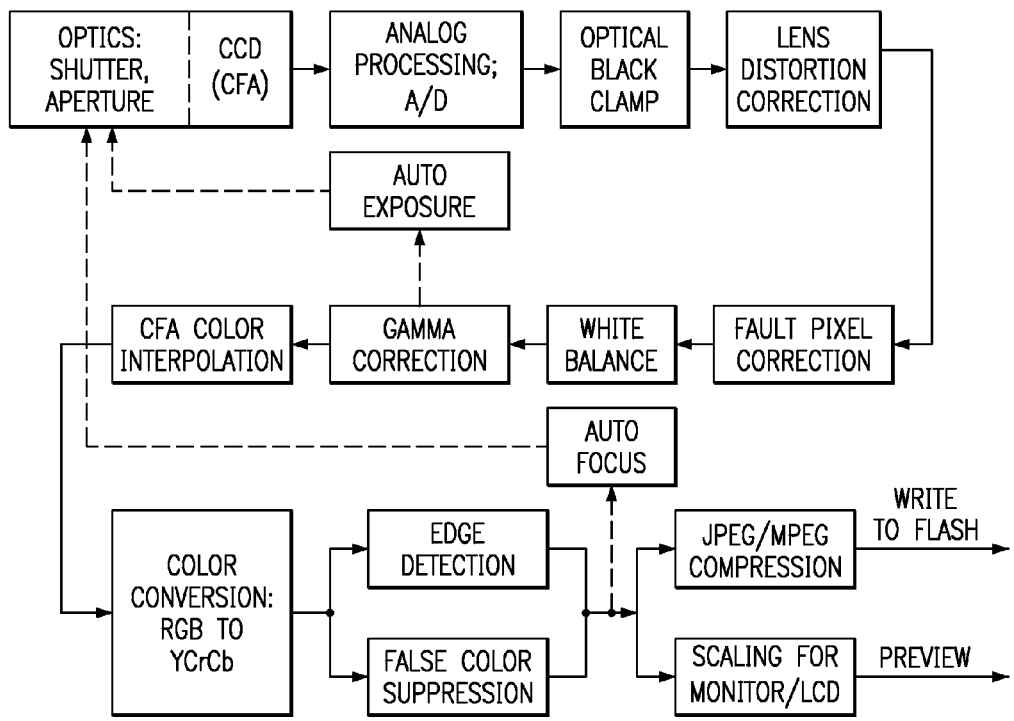
FIG. 5 shows a digital still camera.

FIG. 5 shows in functional block form a preferred embodiment system (camera) which may incorporate preferred embodiment compression/decompression methods. The functions of FIG. 5 can be performed with digital signal processors (DSP's) or general purpose programmable processors or application specific circuitry or systems on a chip such as both a DSP and RISC processor on the same chip with the RISC processor as controller. Further specialized accelerators, such as useful for CFA color interpolation and JPEG/MPEG encoding (DCT, motion compensation, VLC), could be added to a chip with a DSP and a RISC processor. Captured images could be stored in memory either prior to or after image pipeline processing. The image pipeline functions could be a stored program in an onboard or external ROM, flash EEPROM, or ferroelectric RAM for any programmable processors.

2. Intra Frame Preferred Embodiments

Figure 1:
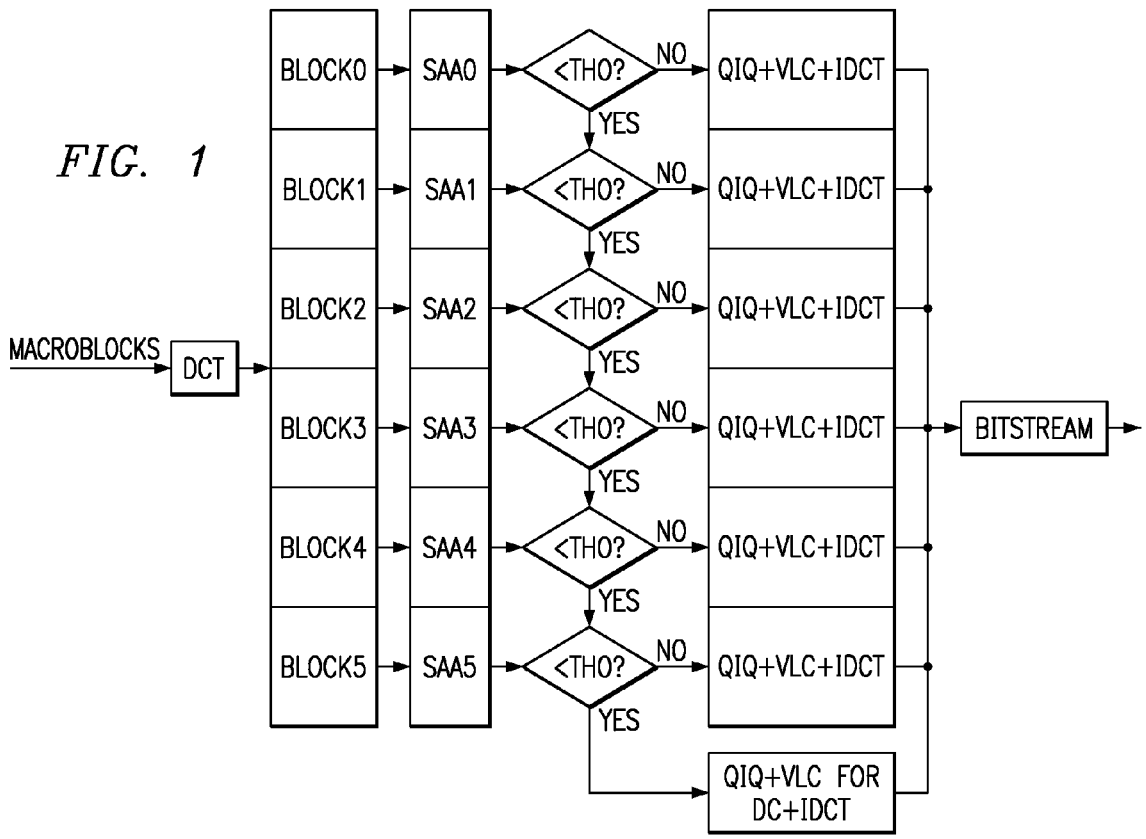
FIGS. 1–2 and 4 illustrate preferred embodiment compression flows.
Figure 4:
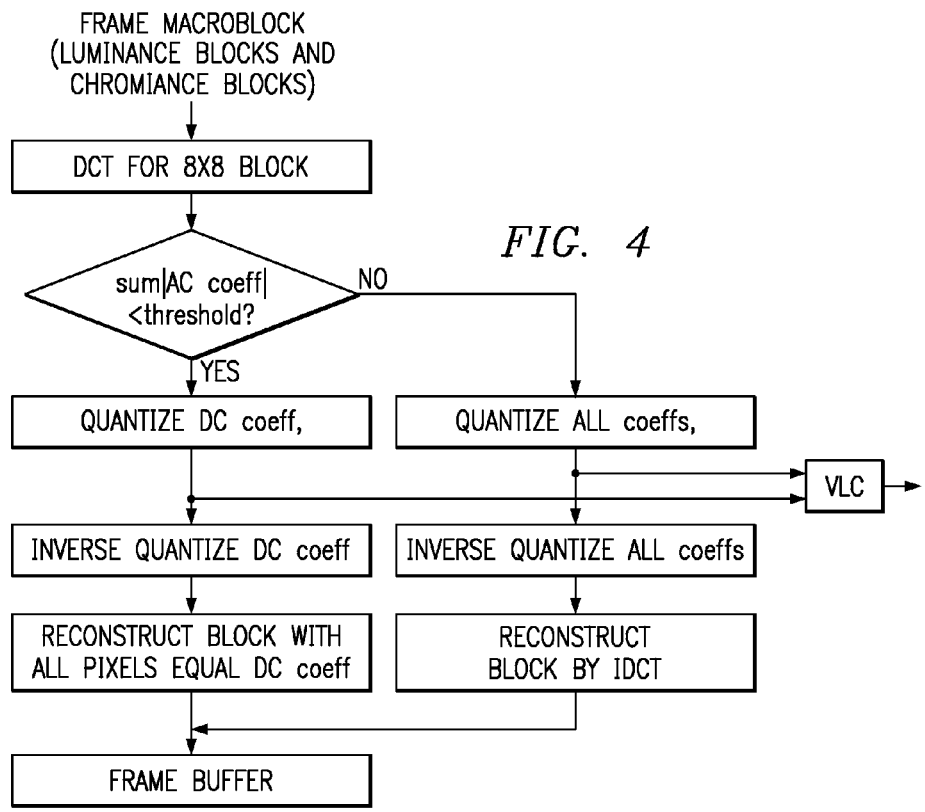

FIG. 1 is a flow diagram for a first preferred embodiment method for a macroblock in an I-frame (the macroblock consists of four luminance blocks, block0, block1, block2, and block3, plus two chrominance blocks, block4 and block5). Such a macroblock is always INTRA-coded. First perform DCT on the macroblock, then compute the Sum of Absolute AC coefficients (SAA) for each 8×8 block in the macroblock. If the SAA of a block is less than the pre-defined threshold Th0 (Th0=9*Q in FIG. 1 where Q is the quantization scale used for the macroblock), all the AC coefficients are assumed to be zero after quantization, so no Quantization/VLC/Inverse-Quantization of the AC coefficients will be performed for this block, only the DC coefficient is quantized and coded by using VLC. Conversely, when the SAA is equal to or greater than the threshold, apply the normal procedure of quantization plus VLC for encoding the block and inverse-quantization plus IDCT for block reconstruction for the frame buffer; see FIG. 4.

Empirically, for the video sequence Coastguard (352×288, 3 Mbit/s, 30 frame/s, I-frame only), the preferred embodiment method predicts about 40% of the blocks as zero-AC blocks at a cost of about 0.05 dB in quality loss.

3. Non-intra Frame Preferred Embodiments

Figure 2:
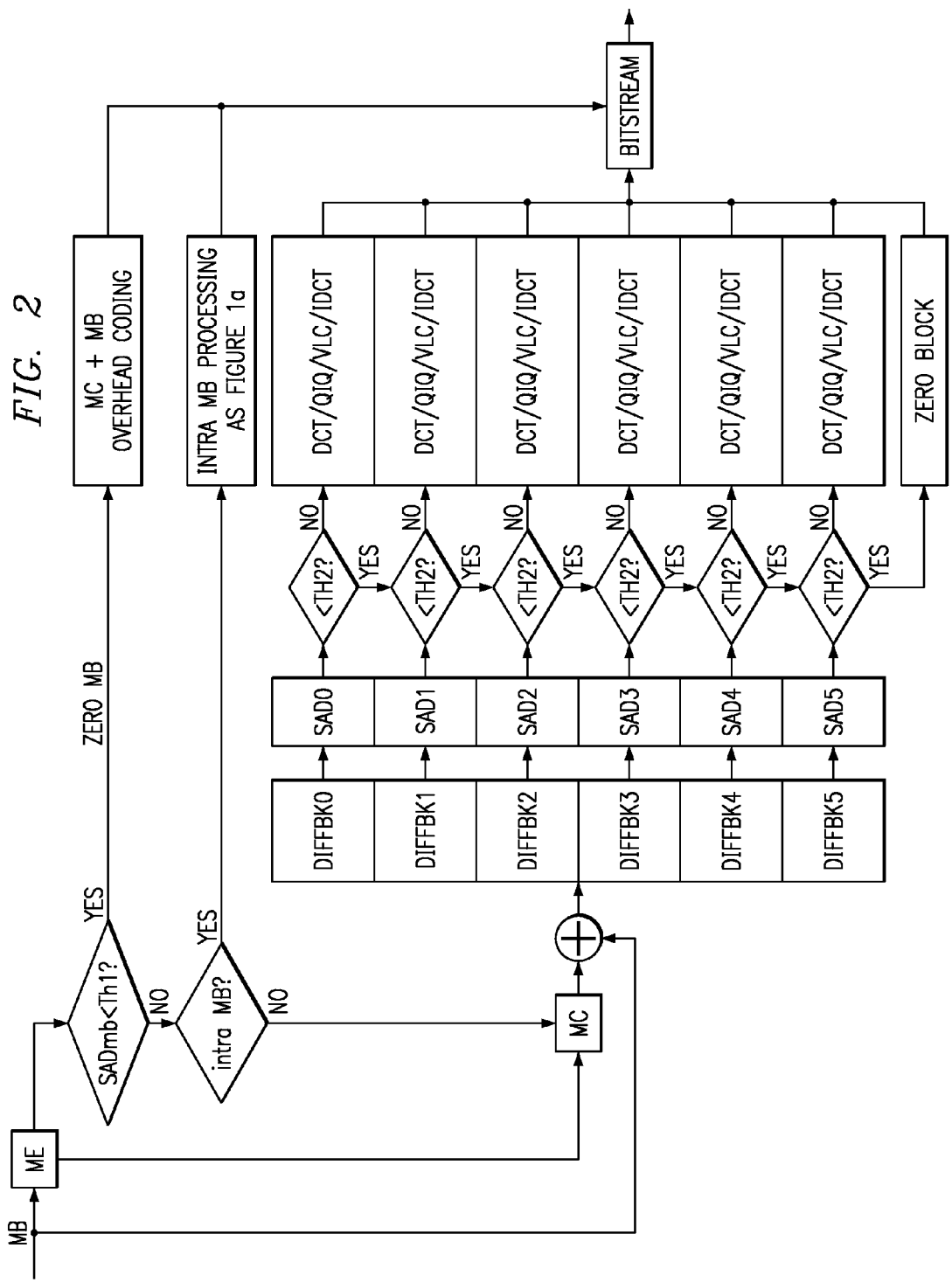

FIG. 2 is a flow diagram for a first preferred embodiment method for a macroblock in a non-Intra frame; the method works in two steps. In the first step, the prediction errors are computed for the 16×16 luminance part of a macroblock for motion estimation (i.e., finding a motion vector using the prior reconstructed frame luminance). If the prediction error size (SAD, sum of absolute differences) is less than a pre-defined threshold Th1 (Th1=80*Q in FIG. 3), the entire macroblock error will be assumed to be zero after quantization (ZERO macroblock), the motion estimation (for 8×8 blocks) is terminated, the macroblock is treated as an Inter-coded macroblock, but no intra/inter decision DCT/IDCT/-Quantization/Inverse-Quantization or VLC will be performed on those macroblocks. Perform the motion compensation and macroblock overhead coding (including the motion vector found, if any, coding); see top portion of FIG. 2. The percentage of zero macroblocks amounts to 15% in a video sequence like Coastguard (352×288, 30 frame/s, 1.5 Mbit/s, IPPP . . . IPPP mode, every 15 frames has one I-frame).

The second step deals with macroblocks which were not determined as zero macroblocks; after motion estimation (finding motion vector) make the intra/inter decision. If a macroblock is determined to be intra-coded (e.g., prediction error too large), the previously-described zero-AC block prediction method that is used for macroblocks in I frames is applied to the macroblock; see FIG. 1. However, if the macroblock is determined to be an inter-coded macroblock, the motion compensation has to be carried out first, SADs are then computed for each 8×8 block of the macroblock. Then if the SAD size of an 8×8 block is smaller than the pre-defined threshold Th2 (Th2=20*Q in FIG. 2), this block will be assumed to be a zero block, so no DCT/IDCT/Quantization/Inverse-Quantization or VLC will be carried out on those blocks either. This step can pre-determine about a further 5% of the luminance blocks and 80% of the chrominance blocks as zero blocks in, e.g., the video sequence Coastguard. The remaining blocks received full motion estimation, DCT, Quantization, VLC, Inverse Quantization, and IDCT.

In short, the preferred embodiment two-step zero block prediction method cuts the encoding complexity to a significant extent in non-Intra frames. For instance in the video sequence Coastguard, the preferred embodiment eliminates about 45% ( i.e. ( 0.2 *4+0.95 *2)/6 ) of the blocks from doing DCT/IDCT/Quantization/Inverse-Quantization/VLC, and about 15% of the macroblocks from doing complete motion estimation because motion estimation terminates if SAD is less than Th1.

Simulation results are pretty positive, in Coastguard ( 352×288, 30 frame/s, 1.5 Mbit/s, IPPP . . . IPPP mode, every 15 frames one I-frame) for example, only 0.03 dB quality loss was measured by adopting the preferred embodiment method.

4. Modifications

The preferred embodiments can be varied while maintaining the features of AC coefficient analysis to decide whether to perform all compression steps.

For example, the thresholds Th0, Th1, and Th2 could each be varied with larger thresholds degrading quality at the benefit of less complexity, and conversely. Thus increasing Th0 from 9*Q to 10*Q, and/or increasing Th1 from 80*Q to 85*Q, and/or increasing Th2 from 20*Q to 22*Q will result in a few more zero blocks and lower complexity as a tradeoff of degraded quality.

Also, other measures of smallness, such as sums of squares, could be used in place of absolute values of the AC coefficients. Likewise, the threshold for the luminance blocks may differ from the threshold for chrominance blocks because high frequency sensitivity of the human eye is primarily in the luminance channel. Further, wavelet and other transform methods could be used in place of DCT with analogous coefficient analysis for compression decisions.

Also, the inter-coding macroblock after the 16×16 motion vector determination the subsequent motion compensation could be with 8×8 motion vectors for each block, so an with 16×16 and 8×8 motion vectors, and chrominance blocks could use the 16×16 motion vectors.

What is claimed is:

1. A method of image compression, comprising:
   (a) transforming a block of pixel values to a set of coefficients;
   (b) comparing a measure of a subset of the set of coefficients to a threshold,
   wherein said subset contains at least two coefficients, and when the measure is less than the threshold, treating the subset as zero coefficients.

2. The method of claim 1, wherein:
   (a) said transforming is a DCT; and
   (b) said subset of the set of coefficients is the subset of AC coefficients.

3. An image compressor, comprising:
(a) a DCT transformer;
(b) a comparator coupled to said transformer and operable to compare a measure of a subset of the set of DCT coefficients from said DCT transformer to a threshold wherein said subset contains at least two coefficients; and
(c) a compressor coupled to the output of said DCT transformer and to said comparator, and when the comparator indicates said measure is less than said threshold, the compressor is operable to treat the subset as zero coefficients.

* * * * *